(12) United States Patent
Schüler et al.

(10) Patent No.: US 8,931,843 B2
(45) Date of Patent: Jan. 13, 2015

(54) FITTING FOR A VEHICLE SEAT

(75) Inventors: Rolf Schüler, Heiligenhaus (DE); Bernd Bossmanns, Mettmann (DE); Karsten Kalmus, Bochum (DE); Peter Thiel, Remscheid (DE)

(73) Assignee: Johnson Controls Components GmbH & Co. KG., Kaiserslautern (DE)

( * ) Notice: Subject to any disclaimer, the term of this patent is extended or adjusted under 35 U.S.C. 154(b) by 396 days.

(21) Appl. No.: 13/375,314

(22) PCT Filed: Aug. 20, 2010

(86) PCT No.: PCT/EP2010/005103
§ 371 (c)(1),
(2), (4) Date: Nov. 30, 2011

(87) PCT Pub. No.: WO2011/023331
PCT Pub. Date: Mar. 3, 2011

(65) Prior Publication Data
US 2012/0086254 A1  Apr. 12, 2012

(30) Foreign Application Priority Data
Aug. 28, 2009  (DE) .......................... 10 2009 040 453

(51) Int. Cl.
*B60N 2/235* (2006.01)
*B60N 2/225* (2006.01)
*F16H 1/32* (2006.01)
*F16H 55/08* (2006.01)

(52) U.S. Cl.
CPC ............... *B60N 2/2252* (2013.01); *F16H 1/32* (2013.01); *F16H 2055/0893* (2013.01)

USPC .......................................... 297/367 R

(58) Field of Classification Search
USPC .......................... 297/367 R, 367 P
See application file for complete search history.

(56) References Cited

U.S. PATENT DOCUMENTS 2,048,688 A  7/1936  De Long
2,447,104 A  8/1948  Trbojevich
(Continued)

FOREIGN PATENT DOCUMENTS

DE  44 36 101 A1  6/1995
DE  40 34 843 C2  4/1997
(Continued)

OTHER PUBLICATIONS

Merrit H E, "Gears", Jan. 1, 2943, XP002650579, pp. 59-69.

*Primary Examiner* — Anthony D Barfield
(74) *Attorney, Agent, or Firm* — McGlew and Tuttle, P.C.

(57) ABSTRACT

A fitting (10), in particular for a motor vehicle seat, having a first fitting part (11), on which a gear rim (17) is formed and a second fitting part (12) on which a gearwheel (16) is formed. The gearwheel meshes with the gear rim (17), whereby the two fitting parts (11, 12) are in geared connection with each other. The fitting also has a rotatably mounted, revolving eccentric driven by a driving element for driving a relative rolling motion of gearwheel (16) and gear rim (17). During this rolling motion a tooth flank (16*d*) of a tooth (16*a*) of the gearwheel (16) rests against a tooth flank (17*d*) of a tooth (17*a*) of the gear rim (17) at a contact point (K). The tooth flanks (16*d*, 17*d*) of the teeth (16*a*, 17*a*) of the gearwheel (16) and gear rim (17) resting against each other at the contact point (K) each follow the course of a portion of a respective logarithmic spiral.

15 Claims, 5 Drawing Sheets

(56) References Cited

U.S. PATENT DOCUMENTS

| | | |
|---|---|---|
| 5,188,571 A | 2/1993 | Boltze et al. |
| 5,634,689 A | 6/1997 | Putsch et al. |
| 5,871,414 A | 2/1999 | Voss et al. |
| 6,619,743 B1 | 9/2003 | Scholz et al. |
| 6,799,806 B2 | 10/2004 | Eppert et al. |
| 7,946,652 B2 * | 5/2011 | Stilleke et al. ............ 297/367 R |
| 7,950,741 B2 * | 5/2011 | Mitsuhashi ............... 297/367 R |
| 8,016,356 B2 * | 9/2011 | Mitsuhashi et al. ...... 297/366 X |

2010/0077882 A1   4/2010   Schreiber

FOREIGN PATENT DOCUMENTS

| | | |
|---|---|---|
| DE | 195 48 809 C1 | 5/1997 |
| DE | 199 38 666 A1 | 2/2001 |
| DE | 102007011175 A1 | 9/2008 |
| DE | 10 2009 040 453 A1 | 3/2011 |
| EP | 2068040 A1 | 10/2009 |
| WO | 2008/015845 A1 | 2/2008 |

* cited by examiner

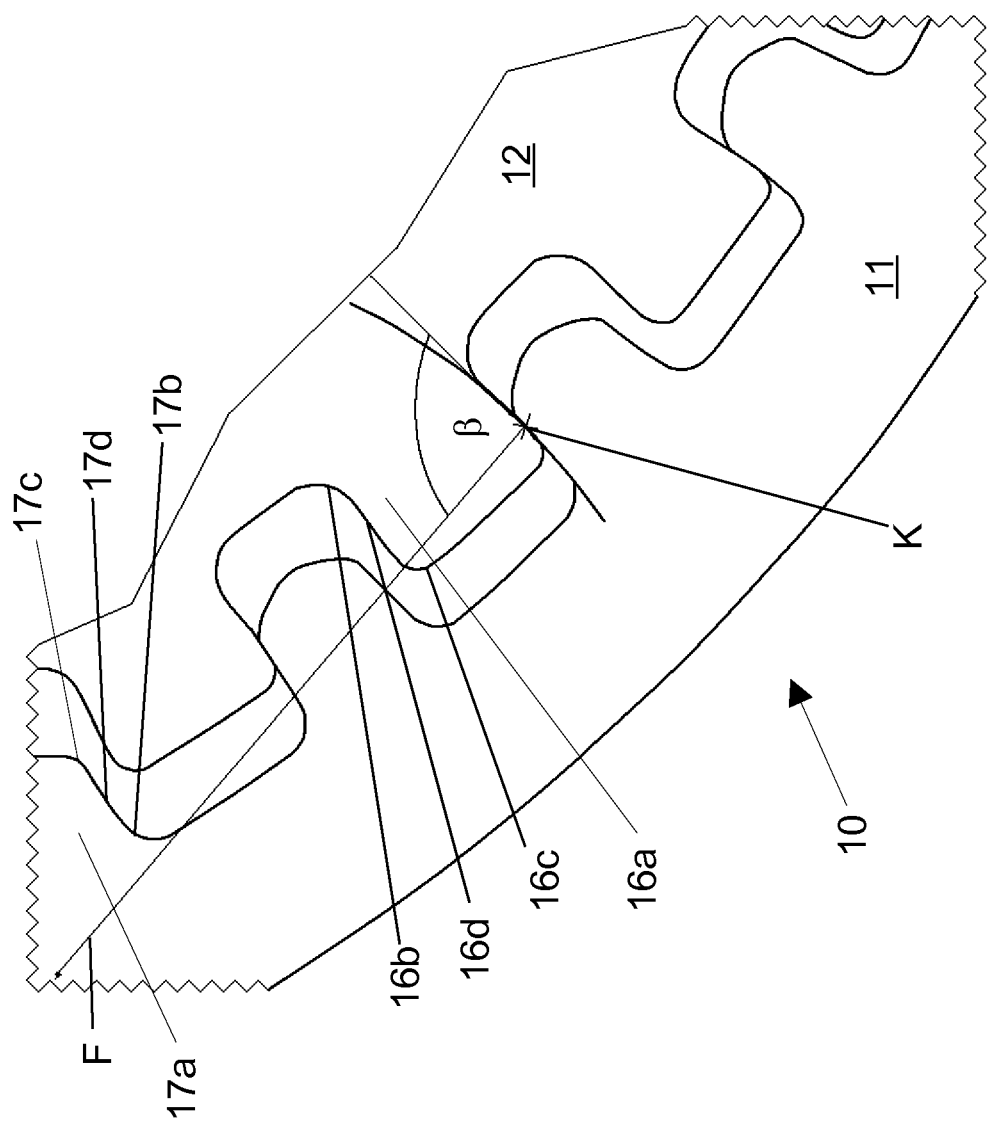

FITTING FOR A VEHICLE SEAT

CROSS REFERENCE TO RELATED APPLICATIONS

This application is a United States National Phase application of International Application PCT/EP2010/005103 and claims the benefit of priority under 35 U.S.C. §119 of German Patent Application DE 10 2009 040 453.8 filed Aug. 28, 2009, the entire contents of which are incorporated herein by reference.

FIELD OF THE INVENTION

The invention relates to a fitting for a vehicle seat, in particular for a motor vehicle seat, having a first fitting part on which is formed a toothed ring, a second fitting part on which is formed a toothed wheel which meshes with the toothed ring, as a result of which the two fitting parts are in gear connection with each other, a rotatably supported circumferential eccentric, driven by a driver, for driving a relative rolling movement of the toothed wheel and the toothed ring.

BACKGROUND OF THE INVENTION

A fitting of this type is known from DE 40 34 843 C2, such fitting serving as a backrest adjusting mechanism. The tooth flanks of toothed wheel and toothed ring which come to bear against one another are configured according to an evolvent toothing.

SUMMARY OF THE INVENTION

An object of the invention is to create a fitting of the type mentioned in the introduction with an alternative toothing.

According to the invention, a fitting is provided comprising a first fitting part having a toothed ring and a second fitting part having a toothed wheel which meshes with the toothed ring, as a result of which the first fitting part and the second fitting part are in gear connection with each other. A rotatably supported circumferential eccentric is driven by a driver for driving a relative rolling movement of the toothed wheel and the toothed ring. During this rolling movement, at a contact point a tooth flank of a tooth of the toothed wheel bears against a tooth flank of a tooth of the toothed ring, wherein the tooth flanks of the teeth of the toothed wheel and the tooth flanks of the teeth of the toothed ring, which bear against each other at the contact point, each follow the course of a section of one logarithmic spiral.

Due to the fact that the tooth flanks of the teeth of toothed wheel and toothed ring such tooth flanks bearing against one another in the contact point, follow the course of a section of a logarithmic spiral, the contact force in the contact point can circulate almost uniformly in a defined direction and with a defined effective lever arm. Tooth tips and tooth roots adjoin as gently as possible, i.e. continuously and differentiably. The section of the logarithmic spiral can lead to indentations within the area of the tooth flanks, i.e. in sections, the teeth have a smaller width radially more inside and a bigger width radially more outside.

The use of an eccentric epicyclic gear system in a fitting enables the inclination of the backrest of a vehicle seat to be adjusted continuously. The saving of a central pinion compared with a planetary gear system leads to the occurrence of a wobbling movement which is superimposed on the relative rotation of the fitting parts. The eccentric which comprises, for example, two wedge segments braced apart by means of a spring, or a sickle-shaped member, is preferably supported, on its side opposing the slide bearing, for example on the inside, on a collar of the other fitting part.

Alternatively to the known solutions, in which either the basic geometric shapes straight line, circular arc, cycloid, trochoid or flank forms (evolvents) which have been developed and optimized for other gear applications with other boundary conditions are used and adapted to real conditions as good as possible in a gear fitting, the solution according to the invention makes it possible to preset the desired force conditions in the gear unit during the rolling movement, to determine from this the surface contour of the teeth required for the respective situation and to form the overall contour of the teeth step by step by sequencing the required single geometry pieces.

An essential reason for the fact that conditions are usually not ideal and not physically exactly correct when using flank forms of conventional gear teeth are the special requirements of an adjustable gear unit which, in addition to the usual task of translating a torque, also must fulfill the requirement of being self-locking and consequently blocking in both directions of load in its idle state and of being free of backlash at the same time. Known gear units and flank shapes which have been developed for them usually dispose of one single contact point or contact area between toothed wheel and toothed ring. This rolling area is nearly always close to the extension of eccentricity, i.e. to the line connecting the axes. With the generic gear fittings, the backlash free state during idle state is obtained by a change of the axes distance, i.e. by moving toothed wheel and toothed ring—in most cases by means of spring-loaded systems in the eccentric—towards each other, as far as this is possible in the corresponding state. In the extreme case, in a known tooth configuration, one single tooth bears with both of its flanks exactly in the extension of eccentricity. This state, during which the axis-reducing force and the contact points are nearly on the same line, naturally is rather instable and is therefore avoided according to the invention. For a very stable position, the teeth are configured in such a way that, in the backlash-free state, there is an angle in the order of a right angle between the contact points.

The invention is explained in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is an enlarged sectional view of FIG. 1;

DESCRIPTION OF THE PREFERRED EMBODIMENTS

Figure 1:
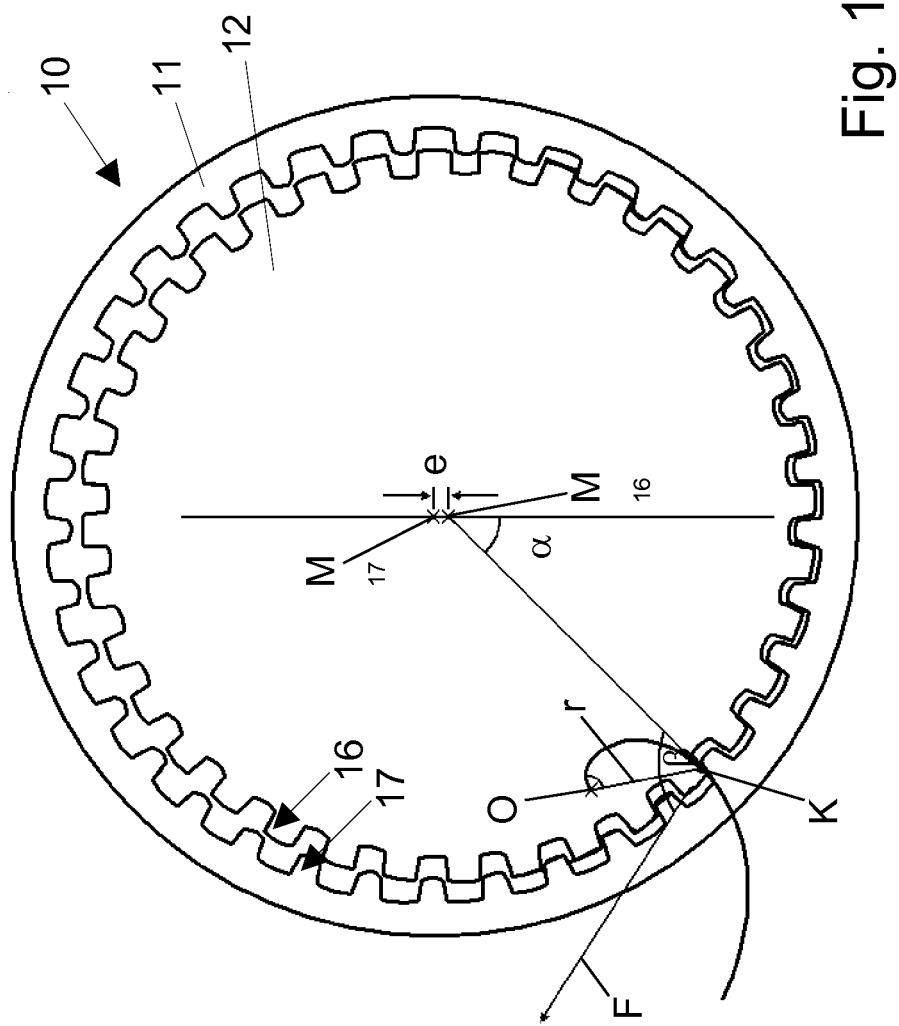
FIG. 1 is view of a radial cut through toothed wheel and toothed ring of the exemplary embodiment.
Figure 5:
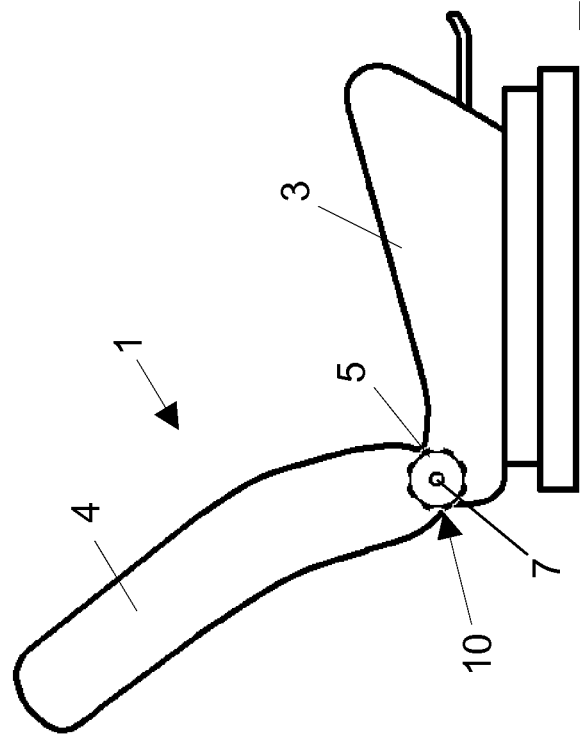
FIG. 5 is a schematic view of a vehicle seat.
Figure 3:
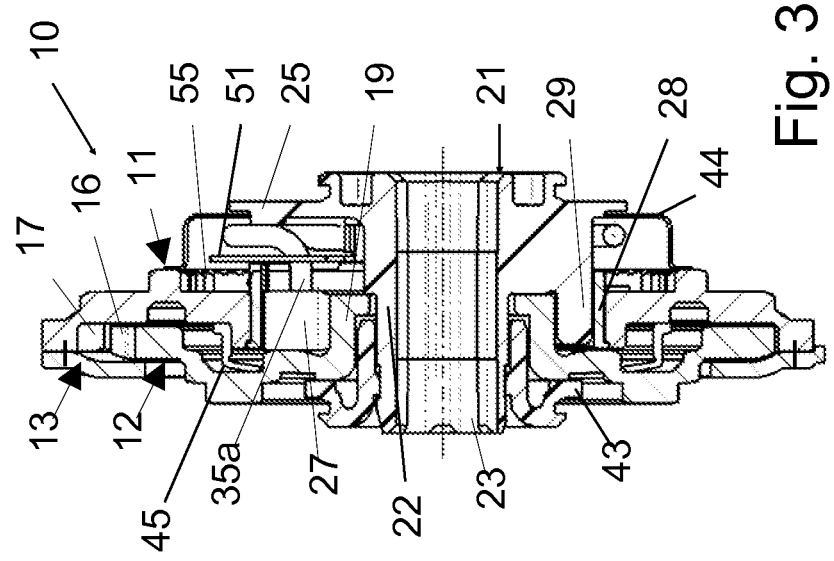
FIG. 3 is an axial cut through view of the exemplary embodiment.
Figure 4:
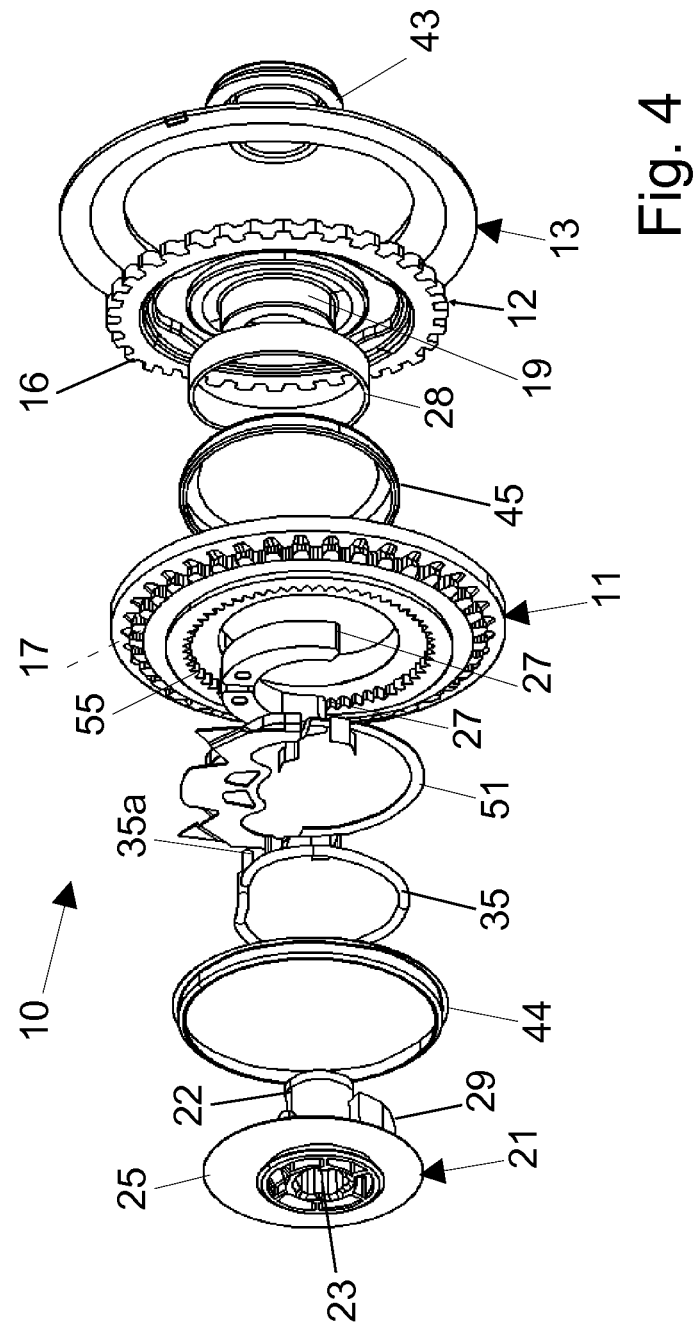
FIG. 4 is an exploded view of the fitting.
Figure 6:
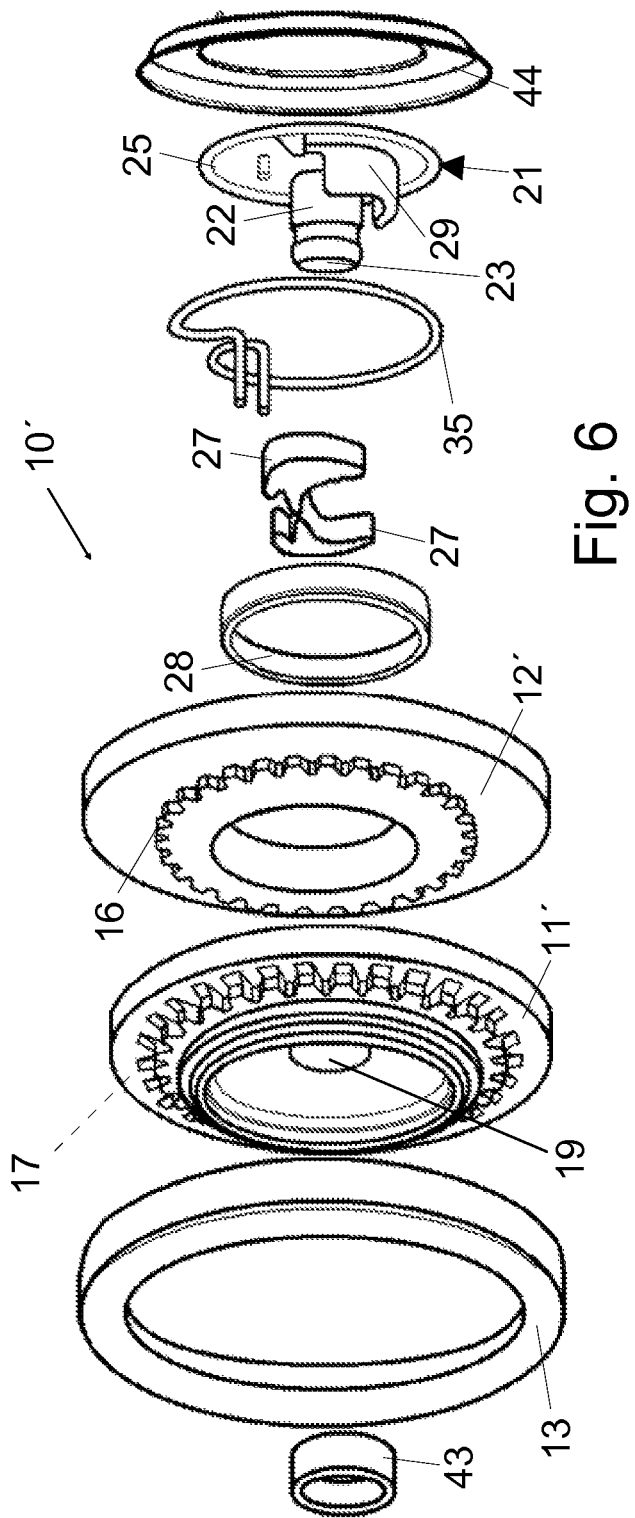
FIG. 6 is an exploded view of a modified fitting.

Referring to the drawings in particular, a vehicle seat 1 for a motor vehicle has a seat part 3 and a backrest 4, the inclination of which is adjustable relative to the seat part 3. In order to adjust the inclination of the backrest 4, a drive shaft 7, which is arranged horizontally in the transition region between the seat part 3 and the backrest 4, is rotated manually, for example, by means of a handwheel 5, or in a motor-driven manner, for example by means of an electrical motor. On both sides of the vehicle seat 1, the drive shaft 7 engages in a fitting 10 so that it is rotationally secure, in a manner which will be described later. The drive shaft 7 defines the adopted directional data of a cylinder coordinate system.

The fitting 10 has a first fitting part 11 and a second fitting part 12 which are rotatable relative to one another. Each of the two fitting parts 11 and 12 can be approximately inscribed in a circular disk shape. The two fitting parts 11 and 12 are preferably composed of metal, in particular steel which, at least in some areas, can be hardened. In order to absorb the axially acting forces, i.e. in order to hold the fitting parts 11 and 12 axially together, an enclosing ring 13 is provided. Such a method of holding parts together by means of an enclosing ring is described, for example, in U.S. Pat. No. 6,799,806 B2. The enclosing ring 13 is preferably composed of metal, in particular of steel, which is preferably unhardened. The enclosing ring 13 has a substantially flat ring shape.

The enclosing ring 13 is (in the present case in an outer edge section) connected tightly to one of the two fitting parts 11 and 12, in the present case to the first fitting part 11, for example welded or beaded (at least partially in the circumferential direction). By means of an end section which is facing radially inwards, the enclosing ring 13 engages over the other one of the two fitting parts 11 and 12 radially outwards, optionally with the interposition of a separate sliding ring, without impeding the relative rotation of the two fitting parts 11 and 12. Moreover, the inner surfaces of the two fitting parts 11 and 12 which face one another are protected from the intrusion of foreign material and from impurities and damage.

The enclosing ring 13 and the fitting part 11 or 12 which is tightly connected with it consequently enclose the other one of the two fitting parts 11 and 12 which is movable relative to them. From a structural point of view, the two fitting parts 11 and 12 together (with the enclosing ring 13) consequently form a disk-shaped unit.

With the mounting of the fitting 10, the first fitting part 11 is, for example, connected tightly to the structure of the backrest 4, i.e. it is fixed with respect to the backrest part. The second fitting part 12 is then connected tightly to the structure of the seat part 3, i.e. it is fixed with respect to the seat part. Those assignments of the fitting parts 11 and 12 can, however, also be exchanged, i.e. the first fitting part 11 would then be fixed with respect to the seat part and the second fitting part 12 would be fixed with respect to the backrest. The fitting 10 consequently is located in the force flow between backrest 4 and seat part 3.

The fitting 10 is in the form of a gear fitting in which a first fitting part 11 and a second fitting part 12 are connected to each other by means of a gear unit for displacement and fixing in position, to be more precise, by means of an eccentric epicyclic gear system, which in the present case is self-locking as described, for example, in DE 44 36 101 A1, the relevant disclosure of which is expressly incorporated herein.

In order to form the gear unit, an externally toothed wheel 16 is formed on the second fitting part 12, and an internally toothed ring 17 is formed on the first fitting part 11, the toothed wheel and the toothed ring meshing with each other. The diameter of the tip circle of the external toothing of the toothed wheel 16 is smaller by at least the depth of one tooth than the diameter of the root circle of the internal toothing of the toothed ring 17. A corresponding difference in the number of teeth of the toothed wheel 16 and the toothed ring 17 of at least one tooth permits a rolling movement of the toothed ring 17 on the toothed wheel 16. The toothed wheel 16 and the toothed ring 17 are formed preferably by means of one single stamping process which simultaneously punches the fitting parts 11 and 12 from their initial material. Alternatively, the fitting parts 11 and 12 can be manufactured—with similar geometries and same functions—by massive forming (preferably cold-flow forming or hot-flow forming). In the present case, the toothed wheel 16 forms the radially outer edge of the second fitting part 12, i.e. radially outward the second fitting part 12 is flush with the toothed wheel 16.

One of the two fitting parts 11 and 12, has a collar 19, in the present case the second fitting part 12, concentrically to the toothed wheel 16. The collar 19 can be integrally formed on (i.e. formed in one piece with) said fitting part as a collar formation or be secured thereto in the form of a separate sleeve. A driver 21 is supported rotatably in the collar 19 by means of a hub 22. The driver 21 is preferably composed of plastic material. The hub 22 of the driver 21 is provided centrally with a bore 23 for receiving the drive shaft 7. The profile of the bore 23 is configured to fit the profile of the drive shaft 7, in the present case a splined shaft profile. Adjoining its hub 22, the driver 21 has a covering disk 25 which is formed in one piece with the hub 22 and which has a larger diameter than the hub 22.

Supported on the collar 19—with their curved inner surfaces—are two wedge segments 27 which bear—with their curved outer surfaces—the other of the two fitting parts 11 and 12, in the present case the first fitting part 11. For this purpose, a receptacle of the last-named fitting part is coated (covered) with a slide bearing bush 28 which is preferably pressed in to be rotationally fixed, and against which the outer surfaces of the wedge segments 27 bear. The concepts "support" and "bear" shall not be limited to a defined direction of the flow of forces by the fitting 10, since this direction depends on the mounting of the fitting 10.

The driver 21 has—spaced radially from the hub 22—a driver segment 29 which engages with clearance between the narrow sides of the wedge segments 27 and which is formed in one piece with the covering disk 25 and the hub 22. The mutually facing broad sides of the wedge segments 27 each receive, with a respective recess defined by projecting sections of material, a respective angled end finger 35a of an omega spring 35. The spring 35 acts upon the wedge segments 27 in the circumferential direction, in particular in order to press them apart, it being possible during operation for the broad sides of the wedge segments 27 to touch and act on each other.

The driver 21 is secured axially on the outside of the fitting part provided with the collar 19 by a securing ring 43 which is preferably clipped on. The securing ring 43 extends in the axial direction along a part of the hub 22, so that the hub 22 does not directly bear against the inside of the collar 19 but, with the interposition of the securing ring 43, is supported in the collar 19 (and consequently the driver 21 is supported on the second fitting part 12). On the outside of the fitting part provided with the slide bearing bush 28 (in the present case of the first fitting part 11), a sealing ring 44 is provided between its radially outermost edge and the covering disk 25, such sealing ring being composed for example of rubber or of soft plastic material and being connected with, in particular clipped to, the covering disk 25. The sealing ring 44 can also be composed of metal and be tightly connected, for example welded, to the first fitting part 11, the covering disk 25 then being movable relative to the sealing ring 44. Within the installation space between the two fitting parts 11 and 12, a separating ring 45, composed for example of plastic material, is optionally provided as internal sealing.

The wedge segments 27 (and the spring 35) define an eccentric which, in the extension of the direction of eccentricity, presses the toothed wheel 16 into the toothed ring 17 at an engagement site. When drive is effected by means of the rotating drive shaft 7 which rotates (several times), a torque is first of all transmitted onto the driver 21 and then, by means of the driver segment 29, onto the eccentric which is so defined and which slides along the slide bearing bush 28, shifting the direction of eccentricity and thus shifting the site of engagement of the toothed wheel 16 in the toothed ring 17, this presenting itself as a wobbling rolling movement, i.e. as a relative rotation with a superimposed wobbling movement. As a result, the inclination of the backrest 4 is continuously adjustable between several use positions.

To improve the dynamic operating characteristics, a retaining spring 51 as has been disclosed, for example in DE 195 48 809 C1, the disclosure of which is expressly incorporated herein (and corresponding U.S. Pat. No. 5,871,414 is incorporated by reference), is still provided preferably as locking element. The retaining spring 51 in the present case cooperates with a toothing 55, which is configured as a further toothed ring at the first fitting part 11. The retaining spring 51—which is preferably supported on an axial projection of the slide bearing bush 28—each time locks the wedge segments 27 in the non-driven state (by the retaining spring 51 locking the spring 35 by bearing against the end fingers 35a) and is released by the driven driver 21.

Each of the teeth 16a of the toothed wheel 16 has radially inward on both sides a tooth root 16b, radially outward a tooth tip 16c and, between them on both sides, one tooth flank 16d each. The tip circle circumscribing the tooth tips 16c and the root circle inscribed by the tooth roots 16b are concentric, in the present case to the receptacle for the eccentric, such receptacle being coated with the slide bearing bush 28, a center point $M_{16}$ and a radial orientation (in cylinder coordinates) of the toothed wheel 16 thus being defined.

The course of two adjacent tooth roots 16b results, for example, from a radius adjoining the one tooth flank 16d (continuous and differentiable), an arc-shaped piece of the root circle or a straight piece which is adjacent tangentially to the root circle, and a mirror-symmetrical radius which is adjoining the next tooth flank 16d. The tooth roots 16b merge in the point of contact to the root circle. The course of a tooth tip 16c results, for example, from a radius adjoining the one tooth flank 16d (continuous and differentiable), a piece bearing against the tip circle and a mirror-symmetrical radius which is adjoining the other tooth flank 16d. The tooth tips 16c touch the tip circle at their radially outermost point.

Correspondingly, each of the teeth 17a of the toothed ring 17 has a tooth root 17b, a tooth tip 17c and two tooth flanks 17d. The tip circle which is inscribed by the tooth tips 17c and the root circle which circumscribes the tooth roots 17b are concentric, in the present case with respect to the collar 19, thus defining a center point $M_{17}$ and a radial orientation (in cylinder coordinates) of the toothed ring 17. The courses of the tooth roots 17b and of the tooth tips 17c preferably correspond to those of the tooth roots 16b and of the tooth tips 16c. The piece which bears against the root circle can be a little longer than that of the toothed wheel 16. The trajectories of the edges of the tooth tips 16c of the toothed wheel 16 define an envelope during a complete rotation of the toothed wheel 16. Preferably, the tooth tip 17c of the toothed ring 17—at least in sections—passes radially equidistant to this envelope. The tooth roots 17b of adjacent teeth 17a merge in their point of contact (of their radially outermost point) with the root circle, thus defining the tooth base enclosed by them. The tooth tips 17c touch the tip circle at their radially inmost point. The eccentricity e (of the eccentric) is the distance between the center point $M_{17}$ of the toothed ring 17 and center point $M_{16}$ of the toothed wheel 16.

It results from the exact configuration of the teeth 16a and 17a, how the teeth 16a, 17a can come into contact, in particular along which contact lines and contact surfaces. In the spiral toothing of the present embodiment, the tooth flanks 16d and 17d—subsequently at one contact point K each get to bear against one another, i.e. they serve for the rolling movement, while the tooth tips 16c, 17c, and the tooth roots 16b, 17b can be configured independently of this. When the fitting 10 is driven, that is to say during the rolling movement, the contact point K is not exactly at the extension of the eccentricity e, but—relative to the center point $M_{16}$ of the toothed wheel 16—it is at a first angle α of 10° to 55°, in particular approximately 35° to 50°, relative to the extension of the eccentricity e. The first angle α depends on the shape of the wedge segments 27, in particular of the wedge angle, and of their position during the rolling movement. With respect to the extension of the eccentricity e, a further contact point occurs on the side opposing contact point K, so that the toothed wheel 16 is supported, i.e. stabilized at three points (eccentric and the two contact points).

At the contact point K, each of the two tooth flanks 16d and 17d follows the course of a section, preferably of a logarithmic spiral each. In the following, this is explained by means of the logarithmic spiral for tooth flank 16d, a corresponding explanation applying to the logarithmic spiral of tooth flank 17d. In a special case, both logarithmic spirals correspond to one another.

With respect to an asymptotic point O, said logarithmic spiral runs according to the formula (in polar coordinates r, φ)

$$r=ae^{k\phi}$$

The asymptotic point O, which can, for example, be arranged within the root circle of the toothed wheel 16, in general is, as shown in FIG. 1, at an angle over the extension of eccentricity e, such angle differing from the first angle α—with respect to the center point $M_{16}$ of the toothed wheel 16. Combined with the parameters a, k, several possibilities of choice are thus available.

Parameters a,k are chosen in such a way that the direction of contact force F in the contact point K points into a defined direction. This defined direction is at a second angle β to the line connecting the center point $M_{16}$ of the toothed wheel 16 and contact point K. The second angle β changes when the contact point K moves along the tooth flank 16d, the direction of contact force F at the last contact point of the tooth flank 16d of a tooth 16a corresponding to the orientation of contact force F at the first contact point of the tooth flank 16d of the next tooth. The second angle β can amount, for example, to 90° to 120°. The change of the second angle β preferable corresponds to the partition angle γ of the toothed wheel 16, i.e. 2π divided by the number of teeth 16a. The effective lever arm is perpendicular to the direction of contact force F, i.e. it deviates from the line connecting center point $M_{16}$ and contact point K.

Parameters a, k besides can be chosen in such a way that the asymptotic point O is on the straight line connecting center point $M_{16}$ of the toothed wheel 16 and contact point K. k then becomes k=−tan β (the algebraic sign depends on which of the two mirror symmetrical flanks 16d is regarded).

The arc length of the section of the logarithmic spiral which serves as tooth flank 16d preferably corresponds to the partition angle γ of the toothed wheel 16 (i.e. 2π divided by the number of teeth 16a). The angle φ of the logarithmic spiral then runs, for example, at an angle range of −γ/2 to +γ/2, what is indicated in FIG. 2. The contact point K in FIG. 2 then corresponds to φ=0. An arc length which is bigger than γ, for example 2γ can, however, also be chosen.

The previously mentioned relationships of parameters a, k and angles and angle areas β, γ and φ correspondingly apply to the logarithmic spiral of the tooth flanks 17d of the teeth 17a of toothed ring 17.

Depending on the choice of the section of the logarithmic spiral (i.e. of the angle range for φ), indentations can occur at the tooth flanks 16d of the toothed wheel and/or at the tooth flanks 17d of the toothed ring 17, so that (approximately) trapezoidal (dovetail) teeth 16a and/or 17a result. Such shapes favor a clear, secure establishing of contact in the area of a larger first angle α at a high solidity since, with a very small first angle α, which is built due to known flank shapes, undesired secondary contacts would occur, which could be avoided only by a reduction of tooth width which reduces solidity.

The toothing according to invention can be used also in a modified fitting 10' (with inverse bearing of the eccentric), the first fitting part 11' of which is provided with the toothed ring 17 and the collar 19 and the second fitting part 12' of which is provided with the toothed wheel 16 and the receptacle (coated with the slide bearing bush 28) for the eccentric. It can be used also in a modified fitting, the fitting parts of which are provided with radially protruding flanges, as it is described, for example, in DE 44 36 101 A1 (corresponding to U.S. Pat. No. 5,634,689) or DE 199 38 666 A1 (corresponding to U.S. Pat. No. 6,619,743).

While specific embodiments of the invention have been described in detail to illustrate the application of the principles of the invention, it will be understood that the invention may be embodied otherwise without departing from such principles.

The invention claimed is:

1. A fitting for a motor vehicle seat, the fitting comprising:
   a first fitting part on which is formed a toothed ring;
   a second fitting part on which is formed a toothed wheel which meshes with the toothed ring, as a result of which the two fitting parts are in gear connection with each other;
   a rotatably supported circumferential eccentric; and
   a driver, the eccentric being driven by the driver for driving a relative rolling movement of the toothed wheel and the toothed ring, wherein, during this rolling movement at one contact point a tooth flank of a tooth of the toothed wheel bears against a tooth flank of a tooth of the toothed ring, wherein the tooth flanks of the teeth of the toothed wheel and the tooth flanks of the teeth of the toothed ring which bear against each other at the contact point, follow the course of a section of one logarithmic spiral each, wherein an eccentricity is provided, defined as a distance between a center point of the toothed ring and a center point of the toothed wheel, wherein, with respect to the center point of the toothed wheel, the contact point is at an angle with respect to an extension of the eccentricity, said angle being 10° to 55°, wherein a contact force in the contact point can circulate almost uniformly in a defined direction and with a defined lever arm.

2. A fitting according to claim 1, wherein an arc length of at least one tooth flank at least corresponds to a partition angle of one of the toothed wheel and the toothed ring.

3. A fitting according to claim 1, wherein, with at least one of the logarithmic spirals, an asymptotic point is on a straight line connecting the contact point and one of a center point of the toothed wheel and a center point of the toothed ring.

4. A fitting according to claim 1, wherein the teeth of the toothed wheel and/or the toothed ring, in a section of the toothed flanks, have a width which is bigger radially outwardly than radially inwardly.

5. A fitting according to claim 4, wherein the teeth of the toothed wheel and/or the toothed ring are approximately trapezoidal.

6. A fitting according to claim 1, wherein, with the teeth of the toothed wheel and the toothed ring bearing against one another at the contact point, a tooth tip of the tooth of the toothed ring runs—at least in sections—equidistantly to an envelope which is defined by trajectories of edges of the tooth tips of the toothed wheel during a complete rotation of the toothed wheel.

7. A fitting according to claim 1, wherein the toothed wheel and the toothed ring bear against one another simultaneously at two contact points.

8. A fitting according to claim 1, wherein the contact force at the contact point is at an angle to a line connecting the center point of the toothed wheel and the contact point.

9. A fitting according to claim 8, wherein the angle of the contact force is 70° to 110°.

10. A vehicle seat comprising:
    a seat part;
    a backrest; and
    a fitting, the inclination of the backrest being adjusted by means of the fitting, the fitting comprising:
    a first fitting part having a toothed ring;
    a second fitting part having a toothed wheel which meshes with the toothed ring, as a result of which the first fitting part and the second fitting part are in gear connection with each other;
    a rotatably supported circumferential eccentric; and
    a driver, the eccentric being driven by the driver for driving a relative rolling movement of the toothed wheel and the toothed ring, wherein, during this rolling movement, at a contact point, a tooth flank of a tooth of the toothed wheel bears against a tooth flank of a tooth of the toothed ring, wherein the tooth flanks of the teeth of the toothed wheel and the tooth flanks of the teeth of the toothed ring, which bear against each other at the contact point, each follow the course of a section of one logarithmic spiral, wherein an eccentricity is provided, defined as a distance between a center point of the toothed ring and a center point of the toothed wheel, wherein, with respect to the center point of the toothed wheel, the contact point is at an angle with respect to an extension of the eccentricity, said angle being 10° to 55°, wherein a contact force in the contact point can circulate almost uniformly in a defined direction and with a defined lever arm.

11. A vehicle according to claim 10, wherein an arc length of at least one tooth flank at least corresponds to a partition angle of one of the toothed wheel and the toothed ring.

12. A vehicle according to claim 10, wherein, with at least one of the logarithmic spiral followed by the tooth flanks of the teeth of the toothed wheel and the tooth flanks of the teeth of the toothed ring, an asymptotic point is on a straight line connecting the contact point and one of a center point of the toothed wheel and a center point of the toothed ring.

13. A vehicle according to claim 10, wherein the teeth of the toothed wheel and/or the toothed ring, in a section of the toothed flanks, have a width which is bigger radially outwardly than radially inwardly.

14. A vehicle according to claim 10, wherein the teeth of the toothed wheel and the toothed ring bear against one another at the contact point such that a tooth tip of the tooth of the toothed ring runs—at least in sections—equidistantly to an envelope which is defined by trajectories of edges of the tooth tips of the toothed wheel during a complete rotation of the toothed wheel.

15. A vehicle according to one of the claim 10, wherein:
the contact force at the contact point is at an angle to a line connecting the center point of the toothed wheel and the contact point of between 70° to 110°.

* * * * *